United States Patent
Wooten (10) Patent No.: US 7,426,627 B2
(45) Date of Patent: Sep. 16, 2008

(54) SELECTIVE ADDRESS TRANSLATION FOR A RESOURCE SUCH AS A HARDWARE DEVICE

(75) Inventor: David Rudolph Wooten, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 428 days.

(21) Appl. No.: 11/372,703

(22) Filed: Mar. 10, 2006

(65) Prior Publication Data

US 2007/0214339 A1    Sep. 13, 2007

(51) Int. Cl.
  *G06F 12/00*    (2006.01)
(52) U.S. Cl. .............. 711/207; 711/141; 711/144; 711/145; 711/202; 711/206
(58) Field of Classification Search ............ 711/206
  See application file for complete search history.

(56) References Cited

U.S. PATENT DOCUMENTS

| | | | | |
|---|---|---|---|---|
| 5,644,748 A * | 7/1997 | Utsunomiya et al. | ......... | 711/207 |
| 5,784,706 A | 7/1998 | Oberlin et al. | ............ | 711/202 |
| 6,128,684 A * | 10/2000 | Okayama | ............ | 710/109 |
| 6,501,761 B1 | 12/2002 | Pannell et al. | ............ | 370/403 |
| 6,804,741 B2 * | 10/2004 | Cowan | ............ | 710/311 |
| 7,334,076 B2 * | 2/2008 | Hendel et al. | ............ | 711/6 |
| 2002/0169938 A1 | 11/2002 | Scott et al. | ............ | 711/207 |
| 2003/0097539 A1 | 5/2003 | Hagersten | ............ | 711/203 |

OTHER PUBLICATIONS

Schoinas, I. Hill, M.D., Address translation mechanisms in network interfaces, Feb. 4, 1998, IEEE.*
David L. Black, Richard F. Rashid, David B. Golub, Charles R. Hill, Robert V. Baron, Translation Lookaside Buffer Consistency: A Software Approach, 1998, ACM.*

* cited by examiner

*Primary Examiner*—Kevin Ellis
*Assistant Examiner*—Kalpit Parikh
(74) *Attorney, Agent, or Firm*—Woodcock Washburn LLP (57) ABSTRACT

A computing system has a resource for providing resource services, where each resource service is accessed by way of a system address (SA). A device requests the resource services of the resource by way of requests, where each request includes a remote address (RA) corresponding to an SA of the resource. A centralized address translator (CAT) has a database of RA/SA translations for the resource and the device, where each RA/SA translation in the database corresponds to a respective RA and SA. The device has a remote address translator (RAT) with a cache for storing priority RA/SA translations as obtained from the CAT. Each priority RA/SA translation in the cache of the RAT includes a validity flag set to indicate whether the priority translation is valid based on whether the SA has changed at the CAT.

12 Claims, 6 Drawing Sheets

SELECTIVE ADDRESS TRANSLATION FOR A RESOURCE SUCH AS A HARDWARE DEVICE

TECHNICAL FIELD

The present invention relates to a method and mechanism that may be employed to selectively perform address translation in a hardware device in cooperation with centralized translation hardware. In particular, the present invention relates to such a method and mechanism that allows controlling software to selectively enable use of translated addresses by the hardware device.

BACKGROUND OF THE INVENTION

As should be appreciated, computer systems have employed mechanisms for controlling access to system memory by hardware devices that perform direct memory access (DMA) on their own behalf rather than using a program on a central processor to copy data to or from the hardware device from or to system memory. This translation mechanism exists to support, among other things, direct control of the hardware device by an application, a virtual machine, etc.

Among other things, a particular entity, device or construct (hereinafter, "entity") on a computing device may require access to a resource associated with the computing device. As may be appreciated, such resource may be any sort of resource that can be associated with a computing device. For example, the resource may be a storage device to store and retrieve data, and generally for any purpose that a storage device would be employed. Likewise, the resource may be any other asset such as a network, a printer, a scanner, a network drive, a virtual drive, a server, and the like. Accordingly, whatever the resource may be, the entity may in fact be provided with access to services provided by such resource.

A typical physical operating system running on a typical physical hardware system allows applications running thereon to employ virtual memory addresses and addressing, and the physical operating system performs address translations between such virtual memory addresses and corresponding physical memory addresses of physical memory. Reasons for use of such virtual memory addressing are known and therefore need not be set forth herein in any detail. Generally, virtual memory addressing frees an application running on an operating system from being concerned with interfering with physical memory employed by another application running on the operating system, and also frees the application from being too closely tied to any particular physical memory structure. Instead, with virtual memory addressing, an address translator of the operating system is employed to perform address translations between corresponding physical and virtual memory address by way of an appropriate database or the like. In doing so, such an address translator also ensures that memory employed by one application is not interfered with or otherwise altered by any other application, and further ensures that each application has appropriate amounts of physical memory allocated thereto.

When a hardware device that performs DMA or the like is employed by an entity to access a corresponding resource, the addresses employed by the entity are virtual addresses. It should be recognized that these virtual addresses do not directly correspond to physical addresses, so, typically, a translation mechanism is introduced between the DMA device and system memory. This translation mechanism uses a database or the like to convert the virtual addresses provided by the DMA device into physical addresses. The translation mechanism is typically referred to as DMA remapping (DMAr) or as an IO memory management unit (IOMMU).

For most systems, an IOMMU will serve multiple DMA devices. That is, DMA requests from multiple devices will be sent to the IOMMU for processing. The IOMMU will use a database that is appropriate for the specific device to translate the virtual address in the DMA request from the device into the appropriate physical address.

An IOMMU will typically have a so-called translation look-aside buffer (IOTLB) in which it may keep a cache of recently used translations. This IOTLB allows the IOMMU to avoid time-consuming database accesses when the same address is used for many DMA operations. Normally, the translations apply to a large portion of memory such as a page so the same page address will be used for multiple DMA operations.

For some entities, the behavior of the centralized IOTLB is not adequate in minimizing the latency impact on DMA accesses. For these entities, it has been proposed that they be allowed to have their own IOTLB so that they can translate the addresses locally before the request is sent to memory. The advantage to local caching of translations is that the device has better knowledge of the way in which memory is going to be accessed and, therefore, it may more efficiently manage its IOTLB whereas the central IOTLB in the IOMMU is purely reactive and only responds to the immediate situation rather than being able to predict the future needs of devices.

One example of the use of the device's IOTLB (hereafter referred to as an address translation cache or "ATC") is an isochronous device. An isochronous device has specific latency requirements so that it can maintain a steady flow of information. In order to prevent an interruption to the flow caused by an untimely, long latency access to the IOMMU database, the isochronous device can request the translations for the addresses that will be used for a transfer before the transfer starts. Then, the ATC will be able to provide the virtual to physical address translation for the isochronous transfer when data is actually available.

Since the ATC contains a cache of information from the IOMMU's database, the ATC must be informed when changes are made to the database that may make a value cached in the ATC no longer valid. An invalidation protocol is used to insure this synchronization between the central IOMMU database and the ATC. When a change is made to the database to a value that may be in an ATC, an invalidate command must be sent to that ATC indicating which GPAs translations have changed. The ATC would then purge its cache of any corresponding translations and send an indication back to the IOMMU to indicate that the entries have been purged. This protocol is time consuming and it is preferred that it not be used frivolously.

In using a remote ATC, many different programming models are possible. In one model, an entity may have a small buffer that is continually used for storage of commands to the device. This so called ring buffer is established when the entity is initialized and the addresses of the buffer do not change until the device is reset. The commands in the buffer may reference memory data buffers with the addresses in the commands expressed as virtual addresses. While the command buffer may be reused continually, the data buffers may be infrequently reused. So, while the device may benefit from having an ATC to use for the addresses of the command buffer, local caching of data buffer translations would not be worthwhile. This application illustrates a major problem with ATCs. The command buffer addresses never change and they are cached in the ATC. The data buffer addresses change quite a lot and they are not cached in the device's ATC.

However, the manager of the IOMMU database does not know that the data buffer addresses are not cached in the device, so whenever it changes an entry in the database for the data buffer, it will send an invalidate to the device's ATC. This results in many useless invalidates being sent to the ATC. If the software controlling the IOMMU database had knowledge of which translations could be in the device's ATC and which could not, it could avoid sending invalidations when none was required.

SUMMARY OF THE INVENTION

The aforementioned needs are satisfied at least in part by the present invention in which a computing system has a resource for providing resource services, where each resource service is accessed by way of a system address (SA). A device of the computing system requests the resource services of the resource by way of requests, where each request includes a remote address (RA). A centralized address translator (CAT) of the computer system has a database of RA/SA translations for the device., where each RA/SA translation in the database corresponds to a respective RA and SA. The CAT receives requests from the device for the resource and for each request translates the RA thereof to the corresponding SA according to the corresponding RA/SA translation in the database and forwards the request with a translated address to the resource.

The device has a remote address translator (RAT) with a cache for storing RA/SA translations as obtained from the CAT. Each RA/SA translation as stored in the database of the CAT includes a priority flag set to indicate whether the RA/SA translation is considered by the RAT to be a priority translation. The validity flag for each priority translation in the cache of the RAT is initially set when the priority translation is obtained from the CAT to indicate that the priority translation is valid. The validity flag for each priority translation in the cache of the RAT is subsequently set to indicate that such priority translation is not valid if the CAT notifies the RAT that the SA associated with the RA has been changed.

The RAT receives requests from the device for access to the resource and for each request determines whether a valid RA/SA translation in its cache corresponds to the RA of the request. If so, the RAT determines whether the corresponding translation is a priority translation. If so, the RAT translates the RA to the corresponding SA, sets a flag in the request to indicate that it contains an SA and forwards the translated request to the CAT. The CAT will inspect the request and if it finds that the request contains an SA it forwards the request to the resource without further translation. Otherwise, if the request does not indicate that it contains a translated address, the CAT will translate the RA in the request to an SA.

If the RAT finds a valid entry in the cache corresponding to the RA but the priority flag is not set, then the RAT will send the request to the CAT with a RA instead of a SA and the flag indicating that the request contains an SA will not be set.

The priority flag is maintained in the database used by the CAT. When the controlling software changes an entry in the database, it checks to see if the device has a RAT and, if so, it checks to see if the priority flag is set. If the device has a RAT and the priority flag is set, then the controlling software will send an invalidate command to the RAT to insure that the cache in the RAT no longer contains the no-longer-valid RA to SA translation. If the priority flag is not set, the controlling software need not send an invalidation as the RAT will not attempt to use the no-longer-valid translation.

The device may use any number of schemes to insure that the cache in the CAT does not fill with entries that do not have the priority flag set. An example scheme is for the device to periodically invalidate all valid entries that do not have the priority flag set. Another example is for the device to track its use of a RA for buffer access. When the RA is no longer required, such as when the associated DMA transfer is complete, any valid entries in the cache of the RAT corresponding to the RA will be invalidated.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
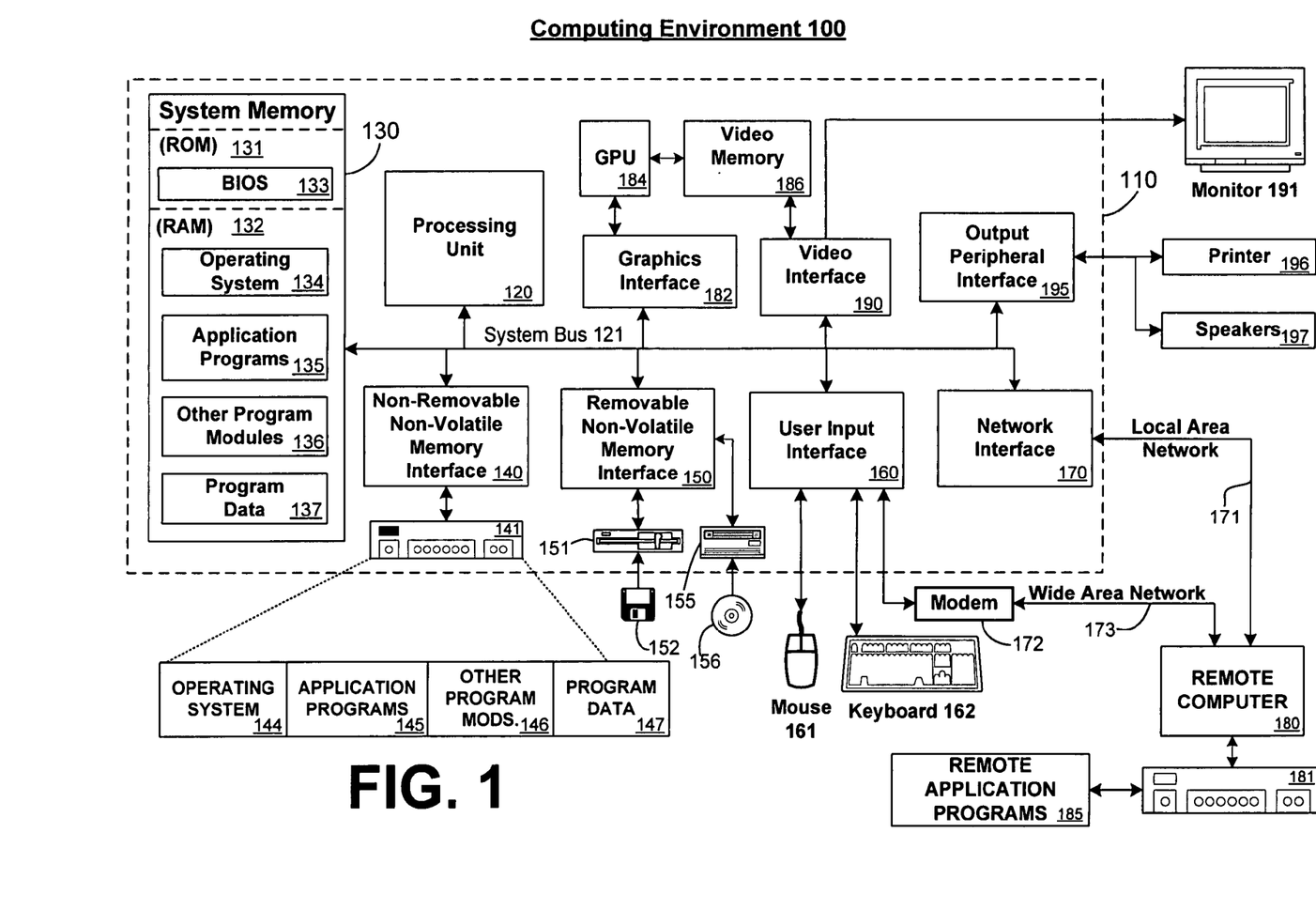
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example. Thus, the present invention may be implemented in an environment of networked hosted services in which very little or minimal client resources are implicated, e.g., a networked environment in which the client device serves merely as a browser or interface to the World Wide Web.

Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), and PCI Express.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection or fiber optic connection, and wireless media such as acoustic, RF, infrared, optical, phased-array antenna operating at any wavelength, directional and non-directional electromagnetic emitters and receivers operating at any wavelength, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
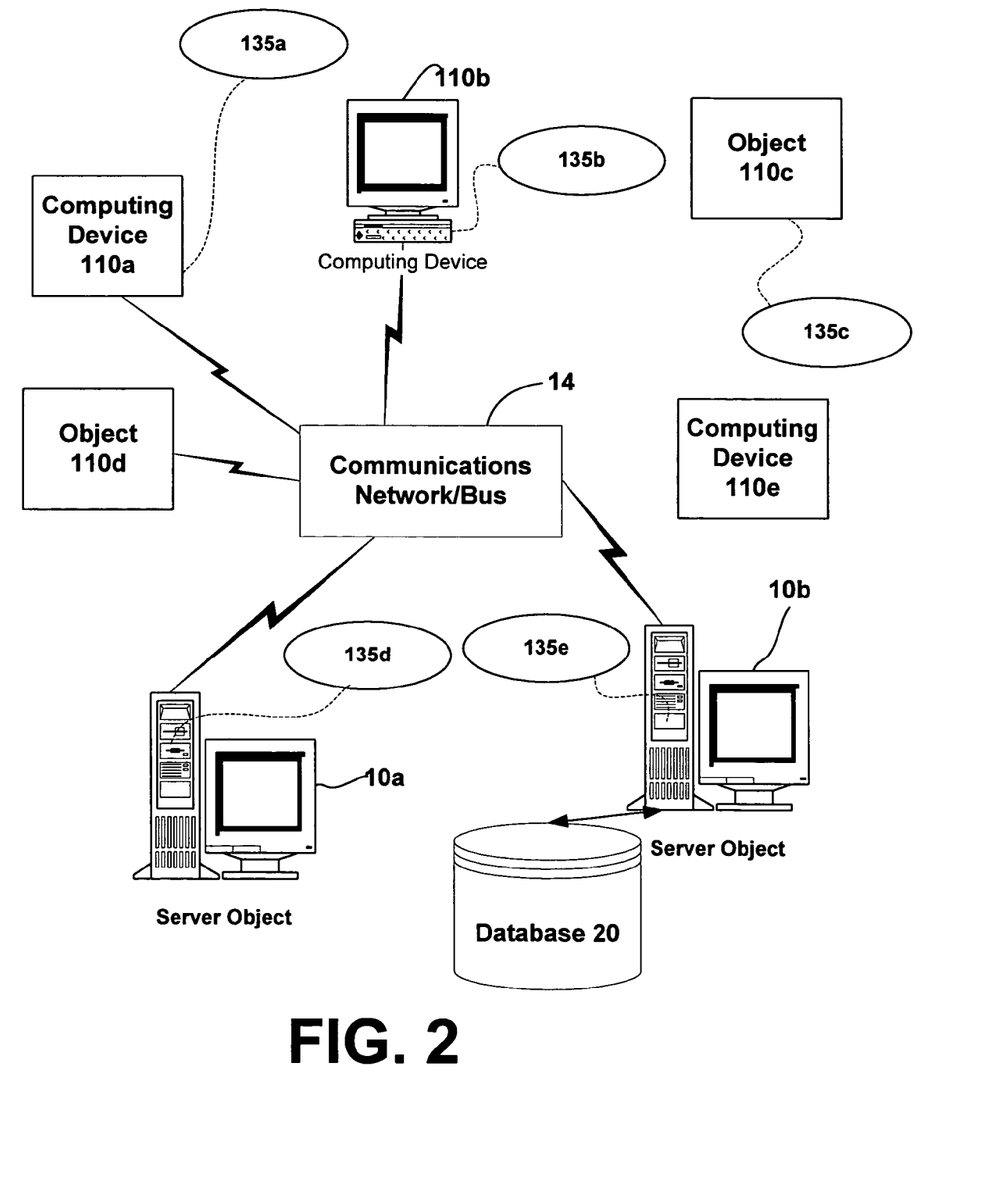
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wire-line or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers processing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source, and to any computing device with which it is desirable to render high performance graphics generated by a virtual machine.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Selective Address Translation

When an entity on a computing device accesses a resource with data at addresses thereon, such as for example a memory, a hard drive, or the like, the entity may include a remote address translator (RAT) that remotely performs address translations between virtual or remote addresses (RAs) of the entity and corresponding physical or system memory addresses (SAs) of the resource. As may be appreciated, the RAT is in essence a satellite address translator that performs translations for the entity based on translations obtained from a centralized address translator (CAT) of the computing device, whereby the RAT can perform at least some of the functions of the CAT for the entity and thus reduce the workload of the CAT, at least with regard to the entity.

Address translation by way of a RAT or CAT or the like is generally known. In such address translation, the translator keeps and refers to a database of corresponding addresses, and updates the database as necessary. Such database may be organized as a table, a tree, or any other logical form, and in such form may include every translatable address or only some translatable addresses as need be.

Thus, for a RA as referenced in a request for data from the entity, the SA in the request must be translated by the RAT into the corresponding SA such that the data of the RA may be accessed from the resource at the corresponding SA. As should be appreciated, however, address translation by a RAT of an entity of a computing device on behalf of the CAT of the computing device presents an issue. In particular, if the CAT provides the RAT with a first SA corresponding to a particular RA, and if the RAT stores the RA/first SA in a cache thereof or the like, and if the CAT thereafter decides to move the data from the first SA to a second SA, the RAT must somehow be notified that the first SA as stored in the cache thereof is no longer valid. Otherwise, a data error will occur if the RAT attempts to use the first SA in the belief that such first SA still corresponds to the particular RA. Alternatively, the RAT must assume that at least some stored SAs in the cache cannot be trusted to be valid.

Figure 3:
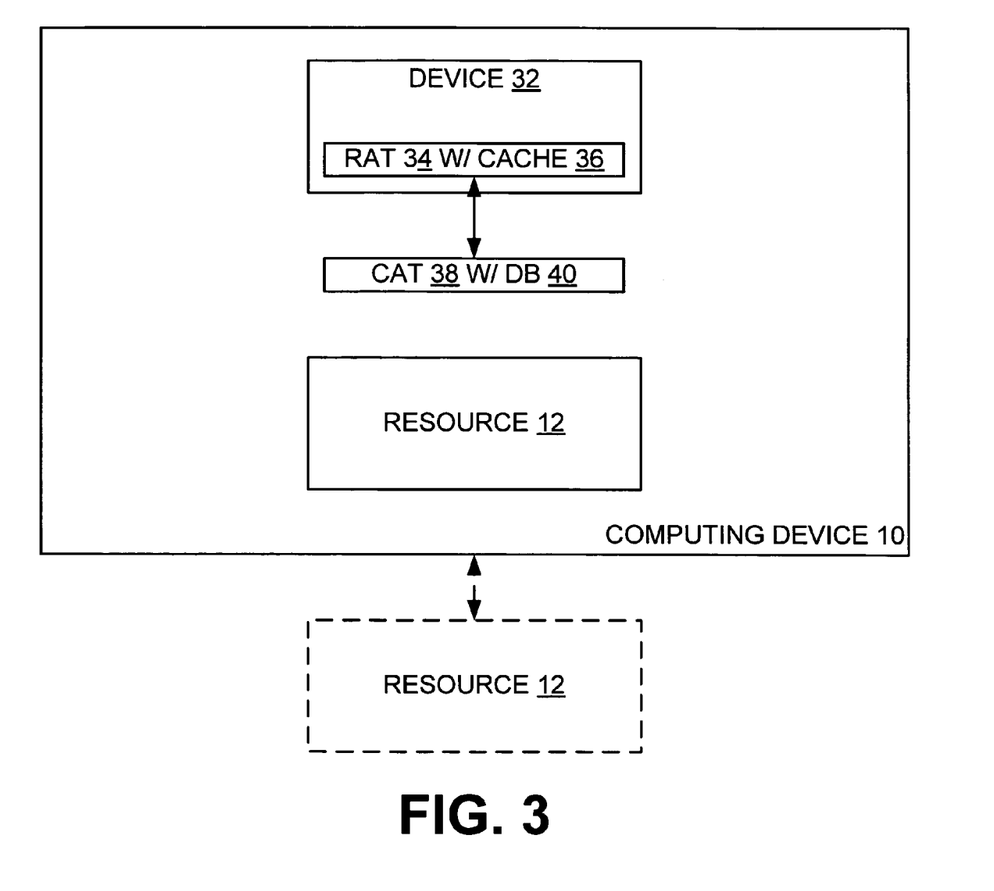
FIG. 3 is a block diagram showing a computing device with a device that employs remote addresses different from system addresses and includes a remote address translator separate from a system address translator of the computing device, where the remote address translator stores translations in a cache in accordance with one embodiment of the present invention.

Referring now to FIG. 3, it should be understood at this point that the aforementioned computing device 10 may be generalized. In particular, the computing device 10 may be any computing system 10 be it a single appliance or a networked collection of appliances, the entity may be considered to be any appropriate device 32 of the computing device 10 with a remote address translator (RAT) 34 with a cache 36, and the computing device 10 has the aforementioned centralized address translator (CAT 38). In such a situation, then, the RAT 34 with the cache 36 translates remote addresses (RAs) employed at the device 32 into system addresses (SAs) such as SPAs employed to access data at the resource 12 of the computing device based on RA/SA pairs or the like cached at the cache 36. Notably, if a particular RA is found in the cache 36, the RAT 34 employs the corresponding cached SA, and the CAT 38 need not be bothered for the RA/SA translation. Of course, if such particular RA is not found in the cache 36, the corresponding SA can be found upon the RAT 34 requesting same from the CAT 38, after which such RA/SA pair or the like can be newly stored in the cache 36 of the RAT 34.

With the device 32 of FIG. 3, then, the issue may be restated as follows: If the CAT 38 provides the RAT 34 of the device 32 with a first SA corresponding to a particular RA, and if the CAT 38 stores the RA/first SA in the cache 36 thereof, and if the CAT 38 thereafter decides to move the data from the first SA to a second SA, the RAT 34 must somehow be notified that the first SA as stored in the cache 36 thereof is no longer valid. Otherwise, a data error will occur if the RAT 34 attempts to use the first SA in the belief that such first SA still corresponds to the particular RA. Alternatively, the RAT 34 must assume that at least some stored SAs in the cache 36 cannot be trusted to be valid.

Thus, to avoid such a data error, and to otherwise provide necessary functionality to the RAT 34, the RAT 34 must be able to access the CAT 38 as necessary to request RA/SA translations therefrom, and the CAT 38 must be able to in fact respond with such RA/SA translations. More to the point, the CAT 38 must be able to notify the RAT 34 when a particular RA/SA translation as stored by the RAT 34 in the cache 36 thereof is invalid, either due to a change or otherwise, and the RAT 34 must be able to tell the CAT 38 that the invalid RA/SA has been noted in the cache 36.

Note, though, that the CAT 38 cannot be burdened with notifying the RAT 34 every time a particular RA/SA translation as stored by the RAT 34 in the cache 36 thereof becomes invalid, especially if the RAT 34 stores a relatively large number of such translations and/or if the CAT 38 invalidates a relatively large number of such translations. In either case, the resources necessary to implement such notification likely are excessive, to the point that the CAT 38 cannot perform normal translation functions for the RAT 38.

Accordingly, in one embodiment of the present invention, a subset of RA/SA translations are identified as being significant or priority translations, and the CAT 38 only notifies the RAT 34 whenever a priority translation as stored by the RAT 34 in the cache 36 thereof becomes invalid. Correspondingly, the CAT 38 does not notify the RAT 34 when a non-priority translation as stored by the RAT 34 in the cache 36 thereof becomes invalid. Of course, for the CAT 38 to notify the RAT 34 when a particular priority RA/SA translation as stored by the RAT 34 in the cache 36 thereof becomes invalid, the CAT 38 must know that such RA/SA translation is in fact a priority translation. Accordingly, the RAT 34 may be constructed to include or have access to knowledge of which RA/SA translations are priority translations, and the RAT 34 communicates such knowledge to the CAT 38. Alternatively, the RAT 34 may have a corresponding driver or the like that includes or has access to such knowledge of which RA/SA translations are priority translations, and the driver (not shown) communicates such knowledge to the CAT 38.

Notably, determining which RA/SA translations are to be priority translations is not necessarily difficult, especially inasmuch as the RA/SA translations that are to be priority translations should primarily include RAs that are more heavily used. Such RAs that are more heavily used correspond to memory locations that are likewise to be more heavily used, as should be appreciated, and such memory locations should be known. For example, if a particular device 32 heavily uses a ring buffer that is given a particular RA, then the RA/SA translation corresponding to such ring buffer RA should be a priority translation which as stored in the cache 36 should be regarded as valid.

Thus, during design and development of the device 32 by a developer or the like, RAs thereof such as the RAs that are relatively heavily used are identified as being priority RAs, and such identified priority RAs are provided to the RAT 34, driver, or another unit related to the device 32 such that such priority RAs can be communicated to the CAT 38. Of course, the priority RAs may be any appropriate RAs including the heavily used RAs and other RAs without departing from the spirit and scope of the present invention.

Figure 4:
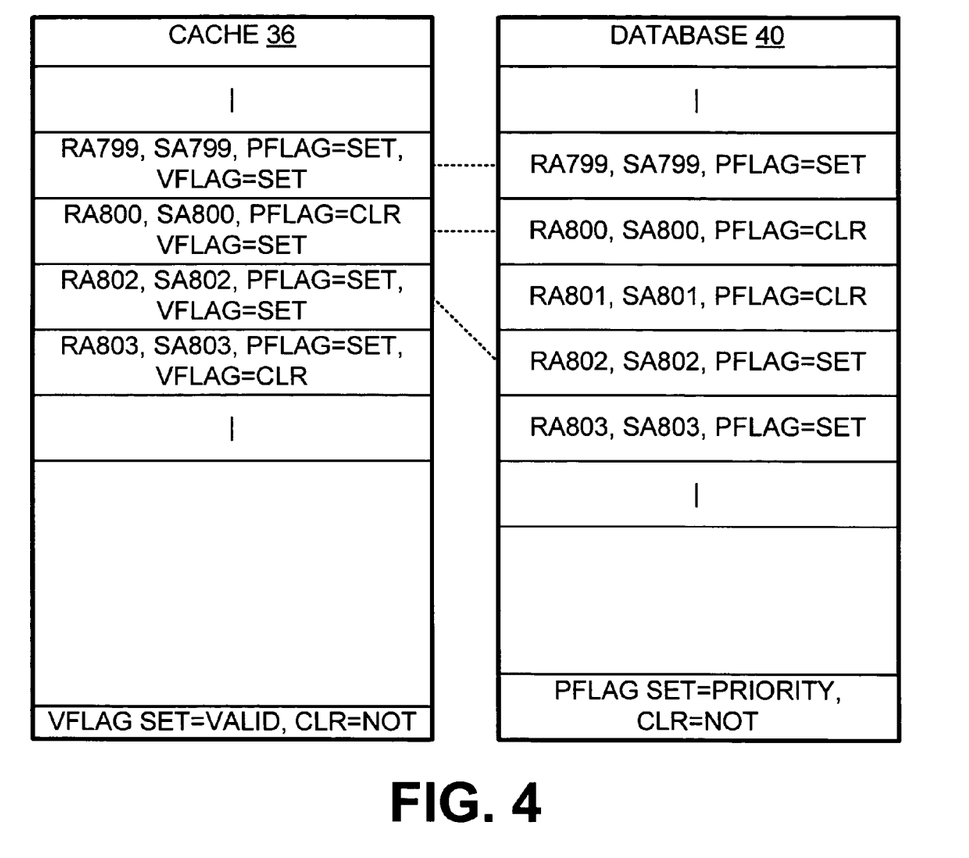
FIG. 4 is a block diagram showing the cache of the remote address translator and a database of the system address translator of FIG. 3 in accordance with one embodiment of the present invention.

Accordingly, and as is shown in FIG. 4, the CAT 38 in operation stores priority RA/SA translations corresponding to the identified priority RAs in the database 40 thereof along with an identification that the RA is a priority RA and the RA/SA transaction is a priority RA/SA transaction. As may be appreciated, such priority identification may for example be a set or cleared priority flag (PFLAG) or bit or the like. Correspondingly, if the CAT 38 in operation stores non-priority RA/SA translations corresponding to non-priority RAs in the database 40, such non-priority translations are stored with an identification that the RA is a non-priority RA and the RA/SA transaction is a non-priority RA/SA transaction. As may be appreciated, such non-priority identification may for example be a set or cleared flag or bit or the like, or more simply may be inferred by the negative of the priority flag.

To summarize so far, in one embodiment of the present invention, with regard to the RAT 34, the CAT 38 is provided with an identification of the priority RAs and RA/SA translations for the RAT 34, where such priority RAs are heavily used or otherwise and employed by the RAT 34 from the cache 36. Thus, the RAT 34 needs to know whether each such priority translation in the cache is still valid. In such embodiment of the present invention, then, the CAT 38 notes each priority RA in the database 40 thereof by way of an appropriate mechanism such as a set priority flag. Thus, each RA and corresponding RA/SA translation in the database 40 of the CAT 38 and also in the cache 36 of the RAT 34 is identified as either a priority RA or a non-priority RA.

In addition, and in one embodiment of the present invention, and as shown in FIG. 4, at least each priority RA and corresponding priority RA/SA translation in the cache 36 of the RAT 34 is identified as either a valid or non-valid translation by way of a validity flag (VFLAG) or the like, in a manner similar to that with regard to the priority flag. Thus, when a corresponding SA changes for a priority RA in the database 40 of the CAT 38, such CAT 38 notifies the RAT 34 or the like, and based on such notification, the validity flag of the corresponding RA/SA translation in the cache 36 of the RAT 34 is changed to show that such priority translation is now non-valid and should not be employed by the RAT 34.

Figure 5:
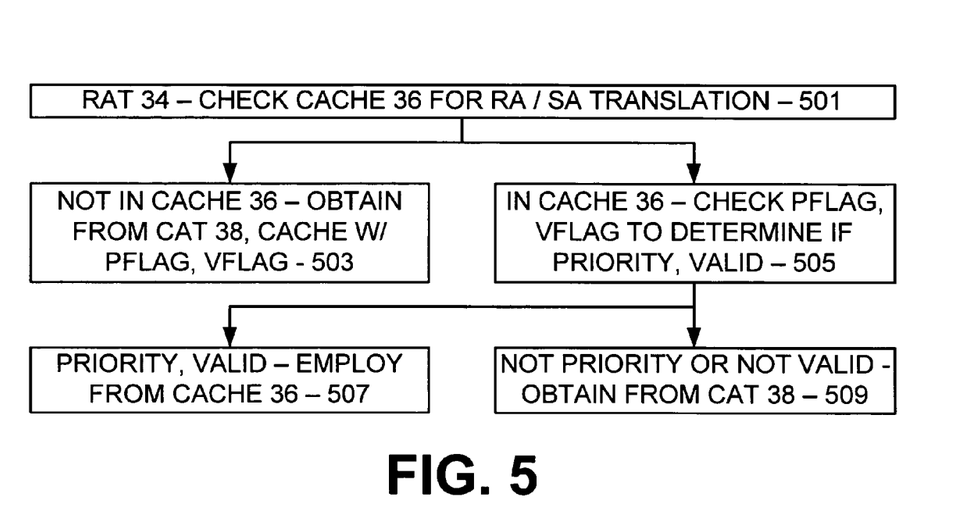
FIGS. 5 and 6 are flow diagrams showing key steps performed in connection with the cache of the remote address translator and the database of the system address translator of FIG. 3 in accordance with one embodiment of the present invention.

Turning now to FIG. 5, it is seen that in the normal course of operation, the RAT 34 in need of a particular RA/SA translation can check to see if same is stored in the cache 36 (step 501). If not in the cache 36, the RAT 34 can request and receive same from the CAT 38 and store such received RA/SA translation in the cache 36 (step 503), particularly if such translation is a priority translation. Significantly, the CAT 38 sends the RA/SA translation with the corresponding priority flag as obtained from the database 40 thereof, and such priority flag is stored within the cache 36 along with the translation. In doing so, and particularly if the RA/SA translation is a priority translation, such priority translation and the corresponding priority flag are stored as at step 503 with a corresponding validity flag set to indicate that the priority translation is valid and has not been revoked or otherwise invalidated by the CAT 38 or any other appropriate authority.

Thus, if upon checking as at step 501 it is found that the translation is in fact stored in the cache 36, the RAT 34 checks the corresponding priority and validity flags to determine if the translation is a priority translation and can be considered valid (step 505). If priority and valid, then, the translation from the cache 36 may be employed without obtaining same from the CAT 38 (step 507). If not priority or if priority but not valid, the translation from the cache 36 may not be employed and instead such translation must be obtained from the CAT 38 (step 509).

Note that although a non-priority translation may be stored in the cache 36, with the priority flag set to so indicate of course, such storage is not believed to be necessary inasmuch as the non-validity of such non-priority translation is not provided by the CAT 38. Thus, such non-priority translation will not be employed by the RAT 34, at least according to step 615.

Figure 6:
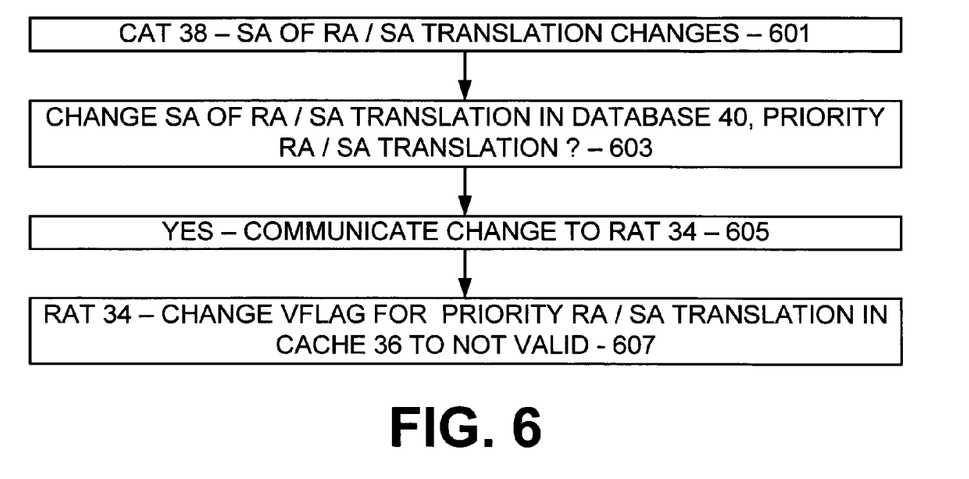

Turning now to FIG. 6, it is seen that if in the normal course of operation the CAT 38 with regard to any RA/SA translation in the database 40 thereof causes the SA to change (step 601), the CAT 38 must change the RA/SA translation in the database 40 and also must determine whether the corresponding flag marks the RA/SA translation as a priority RA/SA translation (step 603). If not, such change need not be communicated to the RAT 34 inasmuch as the RAT 34 should not expect such non-priority RA/SA translation to be valid. However, if so, such change must be communicated to the RAT 34 inasmuch as the RAT 34 does in fact expect such priority RA/SA translation to be valid (step 605). Note that the communication to the RAT 34 may include the new priority RA/SA translation or may simply include a command or the like by which the RAT 34 changes the corresponding validity flag in the cache 36 to reflect that the priority RA/SA translation therein is no longer valid (step 607). Thus, the next time the device 32 requires such priority RA/SA translation, upon reviewing the cache 36 the RAT 34 will determine from the corresponding validity flag that the RA/SA translation therein is not valid, and will thus request same from the CAT 38.

Referring again to FIG. 4, it is seen that the database 40 has an RA/SA translation RA799, SA799 with a corresponding priority flag set to indicate that the translation is a priority translation. Accordingly, and as shown, RA799, SA799 has been stored at the cache 36 with such set priority flag. The same is true for RA802, SA802 and RA803, SA803. Note, though, that, although RA799, SA799 and RA802, SA802 are each stored at the cache 36 with a corresponding validity flag set to indicate that the priority translation is valid, the same is not true for RA803, SA803, which apparently is invalid because the validity flag is clear, meaning that SA803 has changed at the database 40 of CAT 38 and is therefore no longer valid at the cache 36. Thus, RAT 34 will not employ such SA803 from the cache 36 but instead will obtain same from the CAT 38.

Note, too, that both RA800, SA800 and RA801, SA801 are stored at the database 40 with priority flags clear and thus not priority translations. However, while the RAT 34 has chosen to store RA800, SA800 at the cache 36 with the priority flag clear, RA801, SA801 is not likewise stored at such cache 36. Apparently, the RAT 34 has either chosen not to store such RA801, SA801, or has not as yet requested same from the CAT 38.

Note, finally, that with an RA/SA translation at the cache 36 of the RAT 34, a device 32 having the RAT 34 can request data at an address of the resource 12 based either on the RA for the data or the SA for the data. Accordingly, a request from the device 32 for data at an address must include an identification of the type of the address, i.e. RA or SA. As should be appreciated, if an RA the request is directed to the CAT 38 for translation of the RA and further forwarded to the resource 12, while if an SA the request bypasses the CAT 38.

CONCLUSION

The programming necessary to effectuate the processes performed in connection with the present invention is relatively straight-forward and should be apparent to the relevant programming public. In particular, the programming necessary to effectuate the steps of FIGS. 5 and 6 should be apparent based on the functionality necessary for each such step. Accordingly, such programming is not attached hereto. Any particular programming, then, may be employed to effectuate the present invention without departing from the spirit and scope thereof.

In the present invention, a method and mechanism is provided to perform address translation invalidation for a device 32 in a more efficient manner. The method and mechanism perform address translation for the device 32 based on caching at least some RAs/SAs at the device 32. When an RA/SA as may be cached at a device 32 is no longer valid inasmuch as the entry in the database defining the RA/SA translation has been change, a notification is conditionally sent from a CAT identifying to a device that the translation is not valid as cached.

It should be appreciated that changes could be made to the embodiments described above without departing from the inventive concepts thereof. For example, although the present invention is set forth in terms of a resource 12 with data stored at addresses, the resource 12 may also be any other type of resource that employs addresses for access. It should be understood, therefore, that this invention is not limited to the particular embodiments disclosed, but it is intended to cover modifications within the spirit and scope of the present invention as defined by the appended claims.

The invention claimed is:

1. A computing system comprising:
a resource for providing resource services, each resource service being accessed by way of a system address (SA);
a device for requesting the resource services of the resource by way of requests, each request including a remote address (RA) corresponding to an SA of the resource; and
a centralized address translator (CAT) having a database of RA/SA translations for the resource and the device, each RA/SA translation in the database corresponding to a respective RA and SA, the CAT for receiving requests from the device for the resource and for each request translating the RA thereof to the corresponding SA according to the corresponding RA/SA translation in the database and forwarding the translated request to the resource;
the device having a remote address translator (RAT) with a cache for storing RA/SA translations as obtained from the CAT,
each RA/SA translation as stored in the database of the CAT including a priority flag set to indicate whether the RA/SA translation is considered by the RAT to be a priority translation,
each RA/SA translation as stored in the cache of the RAT including a validity flag set to indicate whether the translation is valid,
the validity flag for each priority translation in the cache of the RAT initially being set when the translation is obtained from the CAT to indicate that the priority translation is valid,
the validity flag for each translation in the cache of the RAT subsequently being set to indicate that such translation is not valid if the CAT notifies the RAT that the SA of such translation has been changed,
the RAT for receiving requests from the device for the resource and for each request determining whether an RA/SA translation in the cache corresponds to the RA of the request, and if so determining whether the corresponding translation is a priority translation, and if so determining whether the corresponding validity flag of the corresponding priority translation is set to indicate that such translation is valid, and if so translating the RA to the corresponding SA according to the valid priority RA/SA translation in the cache and forwarding the translated request to the resource, the RAT otherwise forwarding the request to the CAT for address translation.

2. The computing system of claim 1 wherein the resource is a data source storing and providing data, each piece of data being accessed by way of a respective SA.

3. The computing system of claim 1 wherein a driver corresponding to the RAT identifies to the CAT each priority translation.

4. The computing system of claim 1 wherein the RAT requests each RA/SA translation of the cache from the CAT, wherein the CAT responds to each request for an RA/SA translation with the requested translation and a corresponding priority flag set to indicate that the requested translation is a priority translation, and wherein the RAT stores the requested translation and the corresponding priority flag in the cache along with the corresponding validity flag for the priority translation.

5. The computing system of claim 4 wherein the CAT notifies the RAT when the SA of a translation changes if the changed translation was a priority translation as indicated by the corresponding priority flag in the database of the CAT, and wherein the validity flag for the changed translation in the cache of the RAT is thereby set to indicate that such translation is no longer valid.

6. The computing system of claim 1 wherein the RAT requests each RA/SA translation of the cache from the CAT, wherein the CAT responds to each request for an RA/SA translation with the requested translation and a corresponding priority flag set to indicate that the requested translation is not a priority translation if the requested translation is not a priority translation, and wherein the RAT stores the requested translation and the corresponding priority flag in the cache.

7. The computing system of claim 6 wherein the CAT does not notify the RAT when the SA of the requested translation changes if the changed translation is not a priority translation as indicated by the corresponding priority flag in the database of the CAT.

8. The computing system of claim 1 wherein each priority translation is a translation that is to be used relatively more frequently, and wherein each translation that is not a priority translation is to be used relatively less frequently.

9. A method performed in combination with a computing system comprising:
a resource for providing resource services, each resource service being accessed by way of a system address (SA);
a device for requesting the resource services of the resource by way of requests, each request including a remote address (RA) corresponding to an SA of the resource; and
a centralized address translator (CAT) having a database of RA/SA translations for the resource and the device, each RA/SA translation in the database corresponding to a respective RA and SA, the CAT for receiving requests from the device for the resource and for each request translating the RA thereof to the corresponding SA according to the corresponding RA/SA translation in the database and forwarding the translated request to the resource;
the device having a remote address translator (RAT) with a cache for storing RA/SA translations as obtained from the CAT,
each RA/SA translation as stored in the cache of the RAT including a priority flag set to indicate whether the translation is a priority translation and each translation including a validity flag set to indicate whether the translation is valid,
the method comprising:
the RAT receiving a request from the device for the resource;
the RAT determining the RA included with the received request;
the RAT determining that an RA/SA translation exists in the cache corresponds to the RA of the received request;
the RAT thereafter determining whether the corresponding priority flag of the existing translation in the cache is set to indicate that such translation is a priority translation, and if so whether the corresponding valid flag of the priority translation in the cache is set to indicate that such priority translation is valid;
if the translation is a valid priority translation, the RAT translating the RA in the received request to the corresponding SA according to the valid priority RA/SA translation in the cache, and forwarding the translated request to the resource without forwarding the request to the CAT; and
if the translation is not a valid priority translation, the RAT forwarding the received request to the CAT for address translation.

10. The method of claim 9 wherein the resource is a data source storing and providing data, each piece of data being accessed by way of a respective SA.

11. The method of claim 9 further comprising:
the RAT requesting a RA/SA translation from the CAT;
the CAT responding to the request for the RA/SA translation with the requested translation and a corresponding priority flag set to indicate that the requested translation is a priority translation; and
the RAT storing the requested translation and the corresponding priority flag in the cache along with the corresponding validity flag.

12. The method of claim 11 further comprising:
the CAT notifying the RAT when the SA of a priority translation changes; and
the RAT setting the validity flag for the changed translation in the cache of the RAT to indicate that such priority translation is no longer valid.

* * * * *